US012444183B2

(12) United States Patent
Cresswell et al.

(10) Patent No.: US 12,444,183 B2
(45) Date of Patent: Oct. 14, 2025

(54) MODELING DISJOINT MANIFOLDS

(71) Applicant: THE TORONTO-DOMINION BANK, Toronto (CA)

(72) Inventors: Jesse Cole Cresswell, Toronto (CA); Brendan Leigh Ross, Toronto (CA); Anthony Lawrence Caterini, Toronto (CA); Gabriel Loaiza Ganem, Toronto (CA); Bradley Craig Anderson Brown, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 332 days.

(21) Appl. No.: 18/202,455

(22) Filed: May 26, 2023

(65) Prior Publication Data

US 2023/0386190 A1 Nov. 30, 2023

Related U.S. Application Data

(60) Provisional application No. 63/350,340, filed on Jun. 8, 2022, provisional application No. 63/346,815, filed on May 27, 2022.

(51) Int. Cl.
*G06V 10/82* (2022.01)
*G06V 10/762* (2022.01)

(52) U.S. Cl.
CPC .......... *G06V 10/82* (2022.01); *G06V 10/7625* (2022.01)

(58) Field of Classification Search
CPC .................... G06V 10/82; G06V 10/7625
See application file for complete search history.

(56) References Cited

U.S. PATENT DOCUMENTS

2022/0384058 A1* 12/2022 Lee ........................ G16H 20/10

OTHER PUBLICATIONS

Khayatkhoei et al, "Disconnected Manifold Learning for Generative Adversarial Networks", 2018, 32nd Conference on Neural Information Processing Systems (NeurIPS 2018), pp. 1-11 (Year: 2018).*
Chaturvedi, et al., "Constrained Manifold Learning for Videos," 2020 International Joint Conference on Neural Networks (IJCNN), 9 pages; https://ieeexplore.ieee.org/abstract/document/9207617.
International Search Report and Written Opinion issued in PCT/CA2023/050726 on Jul. 18, 2023; 9 pages.

* cited by examiner

*Primary Examiner* — David F Dunphy
(74) *Attorney, Agent, or Firm* — Patent Capital Group (57) ABSTRACT

A computer model is trained to account for data samples in a high-dimensional space as lying on different manifolds, rather than a single manifold to represent the data set, accounting for the data set as a whole as a union of manifolds. Different data samples that may be expected to belong to the same underlying manifold are determined by grouping the data. For generative models, a generative model may be trained that includes a sub-model for each group trained on that group's data samples, such that each sub-model can account for the manifold of that group. The overall generative model includes information describing the frequency to sample from each sub-model to correctly represent the data set as a whole in sampling. Multi-class classification models may also use the grouping to improve classification accuracy by weighing group data samples according to the estimated latent dimensionality of the group.

20 Claims, 7 Drawing Sheets

MODELING DISJOINT MANIFOLDS

CROSS-REFERENCE TO RELATED APPLICATIONS

This application claims the benefit of U.S. Provisional Application No. 63/346,815, filed May 27, 2022, and U.S. Provisional Application No. 63/350,340, filed Jun. 8, 2022, the contents of each of which are hereby incorporated by reference in the entirety.

BACKGROUND

This disclosure relates generally to computer modeling of data on a manifold of high-dimensional space, and more particularly to computer modeling of the data as disjoint manifolds.

Natural data is often observed, captured, or otherwise represented in a "high-dimensional" space of n dimensions ($\mathbb{R}^n$). While the data may be represented in this high-dimensional space, data of interest typically exists on a manifold $\mathcal{M}$ having lower dimensionality $\mathbb{R}^m$ than the high-dimensional space (n>m). The manifold dimensionality may also be referred to herein as a dimensionality of a latent space that may be mapped to the manifold or as the "intrinsic" dimensionality of the data set. For example, the manifold hypothesis states that real-world high-dimensional data tends to have low-dimensional submanifold structure. Elsewhere, data from engineering or the natural sciences can be manifold-supported due to smooth physical constraints. In addition, data samples in these contexts are often drawn from an unknown probability distribution, such that effective modeling of data must both account for the manifold structure of the data and estimate probability only on the manifold—a challenging task to directly perform because the manifold may be "infinitely thin" in the high-dimensional space.

Sampling from these density models may also be used to create "new" data samples different from the input data, such that these density models may also be considered generative models. For example, a generative model trained on images of dogs may aim to learn a manifold in the image space on which the training data lies, which can then be sampled to generate "new" dog images. Such models typically represent the data as a single continuous manifold, which can prevent effective modeling and incorrectly connect what are actually disjoint regions of the output space.

Similarly, multi-class classification models may aim to predict a class from a group of classes. While these models typically do not directly calculate or account for manifolds of the data space, they may still be affected by the different manifolds for different classes, as classes of higher complexity may be more difficult to classify. As such, multi-class classification may be made more effective, as discussed below, by accounting for the manifold complexity of the different classes.

SUMMARY

A computer modeling system considers data samples in a training set as belonging to different manifolds. In addition to such data as not being effectively represented as a single manifold, the different manifolds for different groups of data may also have intrinsic dimensionality, reflecting the complexity of the different manifolds. In training a computer model, rather than consider the data as a single manifold, the training data set may be considered as a "union of manifolds." Individual instances of data item for training may be termed "training samples" "training data items" or "data samples."

Initially, the training data may be grouped to identify groups of data sets that likely belong together on the same manifold. In some circumstances, these may be determined based on explicit labels of the training data samples, and in other circumstances may be determined with a clustering algorithm, such as agglomerative clustering or k-means clustering. This may separate the overall set of training samples into smaller groups of items expected to be more closely related to one another and more likely to lie on the same manifold. In some embodiments, the computer modeling system may also estimate the intrinsic dimensionality of each group of data, which may describe a number of dimensions to properly describe a manifold as a latent space for that data group.

For generative modeling, rather than a single generative model for the entire data set, a generative sub-model is trained for each group of training samples. The generative sub-model may learn to model a manifold of the training data group as well as a probability density, such that the sub-model enables sampling of the sub-model to obtain points on the learned manifold. Each generative sub-model may also have parameters that are set determined based on the latent dimensionality of its data group, such as specifying a number of dimensions for a latent space, modifying a number of layers or other parameters for the model, and otherwise modifying the model complexity based on the "complexity" of the group as represented in the data group's estimated manifold dimensionality.

Each of the sub-models is also associated with a frequency that the data of that group is present in the overall data sample. The generative model for the training data set as a whole may include the set of sub-models and respective frequencies. The respective frequencies for the generative sub-models may together represent a probability distribution for selecting a particular sub-model to generate a sample for the generative model as a whole. As such, for example, when a request for a sample from the generative model is received specifying a number of samples to generate, the sub-model frequencies are used to determine (e.g., by sampling from the probability distribution the specified number of times) a sub-model sample quantity for each sub-model. This enables the of the generative model as a whole to maintain variation in sampling from the sub-models and prevent rigid sub-model sampling ratios. In addition, as one optimization, because the sub-models may contain a large number of model parameters, after determining the sub-model sample quantity for each sub-model, each sub-model may be loaded to memory and generate its samples in a batch, after which the next sub-model may be loaded and generate its batch, optimizing memory and processing operations.

Considerations of a data set as separate manifolds having different complexity is also be applied in some embodiments to improve multi-class classifiers. Although data for such classifiers is typically in the same data space (e.g., images), the underlying complexity of data in a given class may differ, as may be representable in the dimensionality of a manifold of the class data. This can mean that multi-class classifiers may struggle to accurately predict classes having higher intrinsic dimensionality. To improve training of multi-class classification models, the data is grouped (e.g., according to its label), and the dimensionality of the manifold for each group is estimated. When training a classification model, to account for the respective complexity of each group as estimated by the manifold dimensionality, the data points may have respective training losses (e.g., based on a cross-entropy loss function) weighed based on the complexity. As such, data samples associated with higher-complexity groups may be weighed higher than data samples associated with lower-complexity groups. The increased weight for higher-complexity groups may aid in encouraging the model to learn parameters that effectively predict the higher-complexity groups and reduce accuracy reduction due to the complexity.

Together, these approaches provide ways for evaluating data sets as distinct manifolds and incorporating this interpretation in to improve different model types.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Architecture Overview

Figure 1:
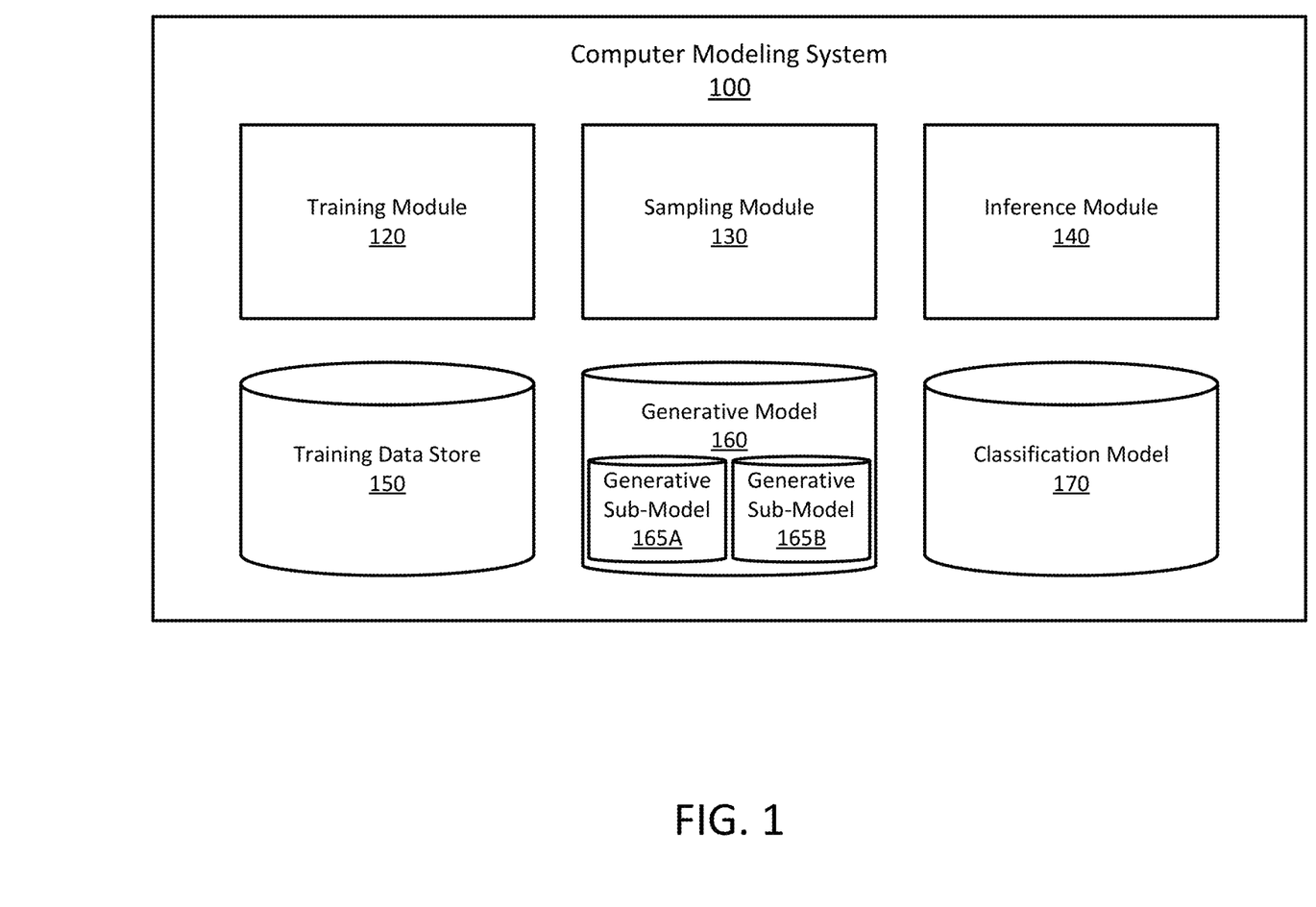
FIG. 1 illustrates a computer modeling system 110 including components for modeling of a high-dimensional space, according to one embodiment.

FIG. 1 illustrates a computer modeling system 110 including components for modeling of a high-dimensional space, according to one embodiment. The computer modeling system 110 includes computing modules and data stores for generating and using computer models such as generative model 160 and classification model 170. The training data store 150 includes training data to be used for model training that is represented in a data space having n dimensions, also referred to a n-dimensional space or a "high-dimensional" space. Rather than analyzing the training data as a whole as belonging to a single manifold M, the training data set is considered to represent several manifolds that may have different intrinsic dimensionality.

In particular, the generative model 160 is trained by a training module 120 to model a probability density for data as a combination of manifolds $M_\ell$ having respective dimensions $d^{(\ell)}$ of an n-dimensional space. The n-dimensional space may also be referred to as a "high-dimensional" space to reflect that the manifolds $M_\ell$ are representable as lower-dimensional spaces (relative to the n-dimensional space). Although relatively simple examples may be discussed as n-dimensional spaces of 2 or 3 dimensions, in practice, the high-dimensional space may represent images, chemical or biological modeling, or other data having thousands or millions of independent dimensions. As such, a manifold of the data in the high-dimensional space is typically "infinitely thin" with respect to the high-dimensional space. Formally, a training data store 150 contains a set of points $x_i$ represented in n dimensions $\{x_i\} \subset \mathbb{R}^n$. The points $x_i$ may also be referred to as training data samples and for probability modeling may be considered to be drawn from an unknown probability density $p_x^*(x)$ to be modeled by the generative model 160. The generative model 160 is trained to learn a probability density $p_x(x)$ as represented by trained/learned parameters of the generative model 160 based on the data points $\{x_i\}$. The generative model 160 includes a plurality of generative sub-models 165A-B, each of which may be used to learn a particular portion of the training data. Although two sub-models are shown in FIG. 1, the generative model 160 may include any number of generative sub-models that correspond to a number of groups of data (each of which is modeled as a distinct manifold).

As such, the training data, which is sampled with respect to a "high-dimensional" space high X may be represented as a union of a number L of closed manifolds:

$$\coprod_{\ell=1}^{L} cl(M_\ell) \subset X$$

in which ⊔ denotes disjoin union, each $M_\ell$ is a manifold of dimension $d^{(\ell)}$, and cl(•) denotes closure in X.

After training, a sampling module 130 may sample outputs from the probability density represented by the combination of generative sub-models 165A-B. The samples may represent probabilistic sampling on the learned manifolds and thus represent "generative" modeling in the output space that differ from the individual data points in the training data store 150. To use the generative model 160, the sampling module 130 probabilistically samples from the individual generative sub-models 165A-B. This enables the generative model to create outputs, in the high-dimensional space, that are similar in structure and distribution to the data points of the training data in the training data store. In some embodiments, an inference module 140 may receive data points or a set of data points to perform probabilistic evaluation with respect to the learned probability density represented by the generative model 160. For example, each generative sub-model 165A-B may represent a particular manifold and probability distribution thereon, and the generative model 160 may include frequencies or other representation of a probability distribution reflecting a probability of each sub-model 165A-B. As such, probabilistic evaluations of data points may be used to determine whether the points are in or out of distribution with respect to the overall probability distribution from the generative model 160, for example determining whether data points belong to any manifold represented by the generative sub-models 165A-B or providing a similar distribution to samples from the generative model 160 overall or to any of its constituent generative sub-models. As such, a group of data points may be evaluated with respect to whether it may be considered "in-distribution" or "out-of-distribution" with respect to the trained probability represented by the generative model 160.

In addition, the training module 120 may also train a classification model 170 for multi-class classification with consideration for the intrinsic dimensionality of the classes. To do so, the training module 120 may determine the intrinsic dimensionality of the data for each group (e.g., a class) and during training modify a weight of the data samples based on the associated group dimensionality. Increasing the weight for more "complex" samples increases the emphasis of these samples in the training process and improves the accuracy of the trained classification model with respect to these classes. To use the classification model 170, an inference module 140 may receive a request to predict a class for an unknown data sample. The classification model 170 is applied to the unknown data sample to predict the class membership with respect to the multiple classes of the trained model.

Further details of each of these aspects is discussed further below.

Figure 2:
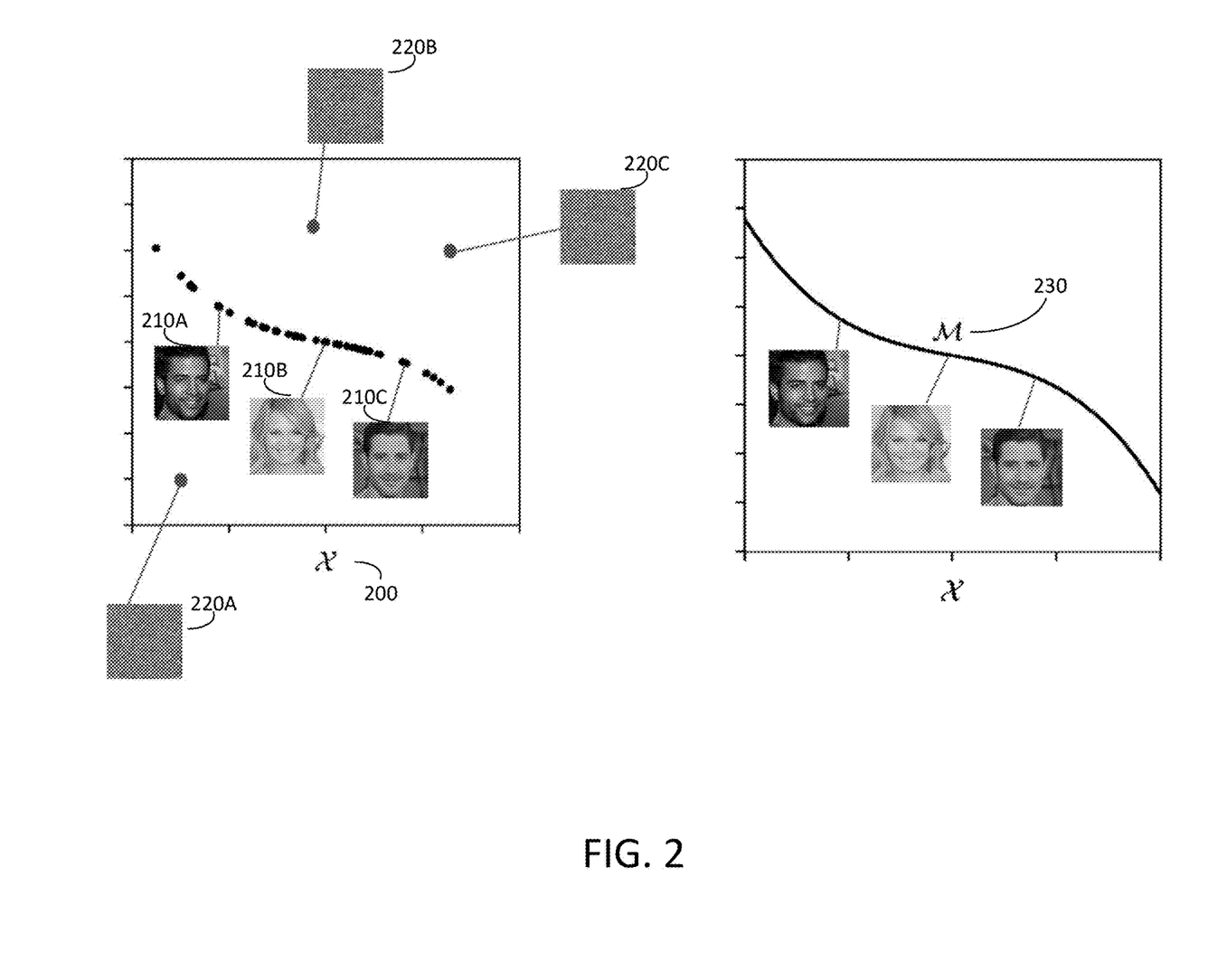
FIG. 2 illustrates an example high-dimensional space in which data points lie along a manifold.

FIG. 2 illustrates an example high-dimensional space in which data points lie along a manifold. In this example, the high-dimensional space 200 represents image data in two dimensions. Though shown in FIG. 2 as an example projection in two dimensions, each point of high-dimensional image data represents an image having dimensions that may have a value for each channel (e.g., 3 channels for RGB color) for each pixel across a length and width of the image. Hence, the total independent dimensional space for an image data point in the high-dimensional space 200, for this example, is the image length times the width times the number of channels times the bit length representing the color value: L×W×C×B. Stated another way, each color channel for each pixel across each pixel position of the image can have any value according to the bit length for that color channel. In practice, however, only some portions of the complete high-dimensional space may be of interest and are represented in the training set. While the range of the complete high-dimensional image data space can be used for any possible image, individual data sets typically describe a subset of the high-dimensional space 200. In this example, a data set of human faces includes data points 210A-C. However, many points in the image data space do not represent human faces and may have no visually meaningful information at all, such as data points 220A-C, depicting points in the high-dimensional space 200 that have no relation to the type of data of the human face data set. As such, while the high-dimensional space 200 may permit a large number of possible positions of data points, in practice, data sets (e.g., human faces) represent some portion of the high-dimensional space that may be characterized as a region representable in fewer independent dimensions. The region of the high-dimensional space may be described as a manifold 230 of the high-dimensional space. The manifold 230 is thus learned to generally describe the "shape" of the data points within the high-dimensional space and may thus be considered to describe constraints on the areas in which data points exist and the interactions between them. For example, a data set of human faces may generally exist in a region of possible images in which there are identifiable facial features such as an identifiable nose, eyes, mouth, and depending on the pose of the face may include certain positional relationships among them or may generally be symmetrical, etc.

Figure 3:
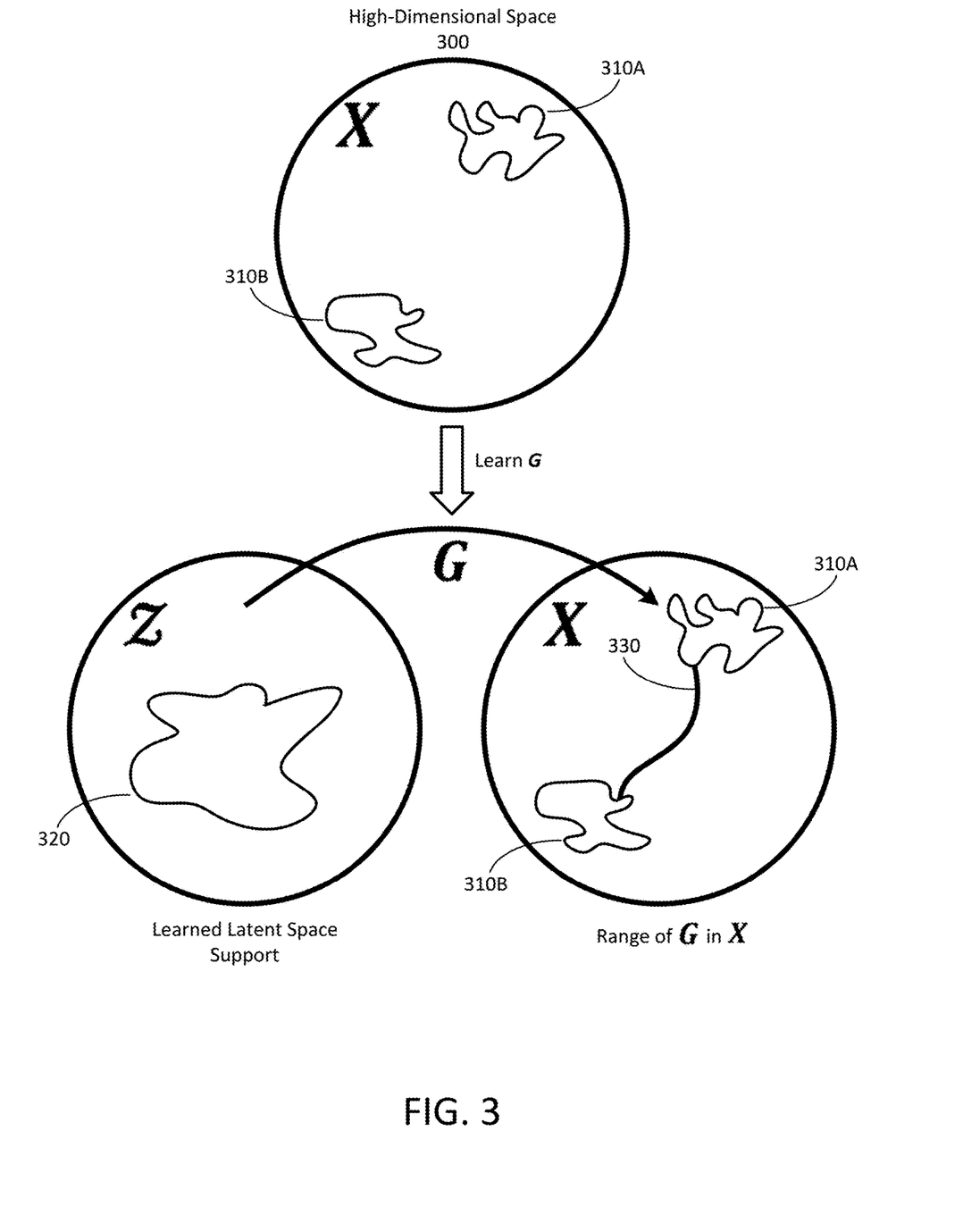
FIG. 3 illustrates errors that may occur when disjoint manifolds are learned as a single manifold.

FIG. 3 illustrates errors that may occur when disjoint manifolds are learned as a single manifold. In many cases, generative models learn a high-dimensional space 300 as a manifold represented in a latent space Z with a learned mapping G from the latent space Z to the high-dimensional space. This approach for generative models is referred to herein as "pushforward" generative models, in which a base distribution, which may itself be trainable, can be sampled with respect to the latent space Z and is then "pushed forward" through a mapping function G to the high-dimensional output space. This may also be represented as: $Z \sim \mathbb{P}_z$ and $X = G(Z)$.

Such pushforward generative models include variational autoencoders (VAEs), normalizing flows (NFs), generative adversarial networks (GANs), and Wasserstein autoencoders (WAEs). However, as shown in FIG. 3, one problem with these approaches is that the manifold is typically represented as a closed region 320 in the latent space. However, because the pushforward function G is configured to model a single manifold in the high-dimensional space, mapping of the base distribution in the latent space (Z) to the high-dimensional space (X) is continuous. As such, when training data points actually lie on separate manifolds in the high-dimensional space 300, such as manifolds 310A, B, the pushforward function G does not accurately capture the discontinuity between manifolds. Instead, it also outputs values to a supplemental region 330 to force continuity between the manifolds 310A, B in the output space. This may also cause non-zero probabilities for the supplemental region 330 as the base probability is also pushed through to the supplemental region 330. As a further difficulty, the different manifolds 310A, B may have different intrinsic dimensionality. When estimated as a single manifold in one latent space as in FIG. 3, this also enforces the same intrinsic dimensionality across the data space, preventing subregions from accurately representing the different complexities of those subregions.

As an example of data that lies on different, disconnected manifolds, consider the MNIST data set of digits from 0 to 9. The set of images include a variety of examples for writing that digit in a recognizable way. Interpreted as manifolds, any digit "2" on MNIST may be likely be capable of transformation to another "2" while remaining recognizable as a "2" (i.e., through a sequence of intermediate images that are recognizable as "2" and thus remaining on a manifold of "2s.") Similarly, an "8" is likely transformable to other "8s." However, it is likely impossible to transform a "2" to an "8" without leaving the manifold of 2 and without appearing as an intermediate image that is neither a 2 nor an 8. But a single continuous manifold that represents both 2s and 8s requires some region that connects "2s" and "8s." As such, generative models that attempt to do so will typically model that connected region (see FIG. 7) with non-zero probability.

Figure 4:
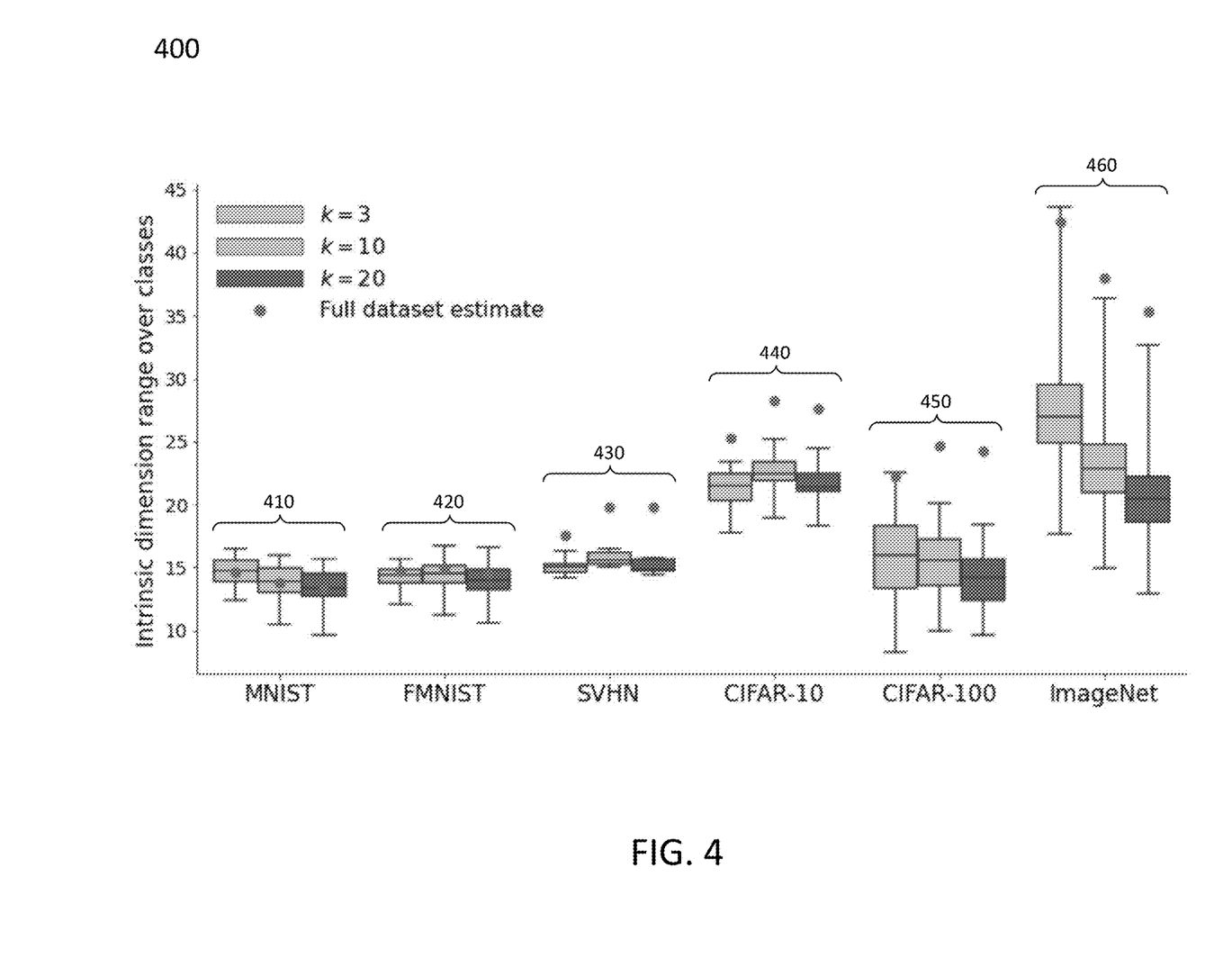
FIG. 4 shows an example boxplot of the intrinsic dimensionality of various image data sets.

FIG. 4 shows an example boxplot of the intrinsic dimensionality of various image data sets. The intrinsic dimensionality for a data set can be estimated with various approaches in different embodiments. The intrinsic dimensionality may represent a data set's complexity and be used in different embodiments to a) set a number of dimensions for a latent space to model a manifold (i.e., as a determined manifold dimensionality) or b) focus classification training on groups having higher intrinsic dimensionality. In the discussion below (and as one embodiment of the estimation step that may be performed in training), dimensionality estimation may be provided based on:

$$\hat{d}_k := \left( \frac{1}{n(k-1)} \sum_{i=1}^{n} \sum_{j=1}^{k-1} \log \frac{T_k(x_i)}{T_j(x_i)} \right)^{-1}$$

Equation 1

In Equation 1, $T_j(x_i)$ is the Euclidean distance from x to its $j^{th}$-nearest neighbor in $\mathcal{D} \backslash \{x\}$ and k is a hyperparameter specifying the maximum number of nearest-neighbors to consider.

With results shown in FIG. 4, for each image data set of MNIST 410, Fashion MNIST 420 (FMNIST), SVHN 430, CIFAR-10 440, CIFAR-100 450, and ImageNet 460, intrinsic dimensionality was calculated with varying values of hyperparameter k for each data set class and for the data set as a whole. The results are plotted in boxplot 400 indicating the resulting values of intrinsic dimensionality for the classes and for the data set as a whole.

Two relevant patterns emerge across the data sets. First, within each data set, results are mostly consistent across different choices of k. Second, for all data sets except SVHN 430, there is a relatively wide range of intrinsic dimensionality across classes. In other words, these results support that these data sets may be better modeled with consideration of the different class complexity, for example as disjoint manifolds with differing latent dimensionality.

Figure 5:
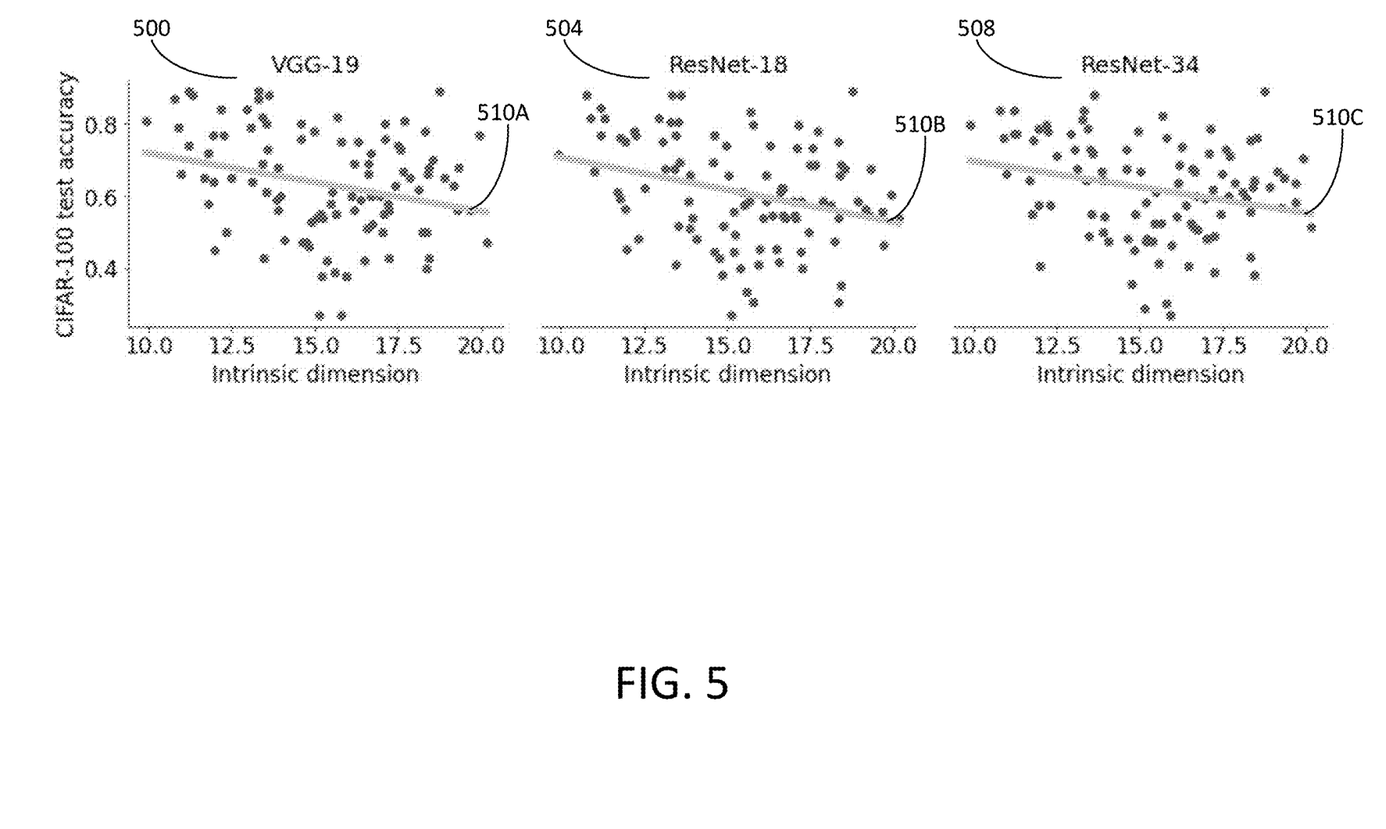
FIG. 5 illustrates an example analysis of multi-class classification accuracy plotted with intrinsic dimensionality.

FIG. 5 illustrates an example analysis of multi-class classification accuracy plotted with intrinsic dimensionality. After training with a cross-entropy loss, the accuracy of the resulting model was plotted for individual classes against the intrinsic dimension of that class for image classification networks VGG-19 500, ResNet-18 504, and Resnet-34 508. A regression 510A-C for each classification network shows that on average, for each of these image networks, as the intrinsic dimensionality of a class increases, the accuracy of the model in predicting that class decreases, suggesting that the increased complexity represented in the increased intrinsic dimensionality correlates in worse predictive performance.

As discussed further below, by accounting for the disjoint nature of the manifolds and accounting for the intrinsic dimensionality of different types of images, improved generative and classification models can account for these aspects of the underlying data to improve their performance, more accurately capturing the data manifolds and improving classification accuracy.

Generative Modeling with Manifold Sub-Models

Figure 6:
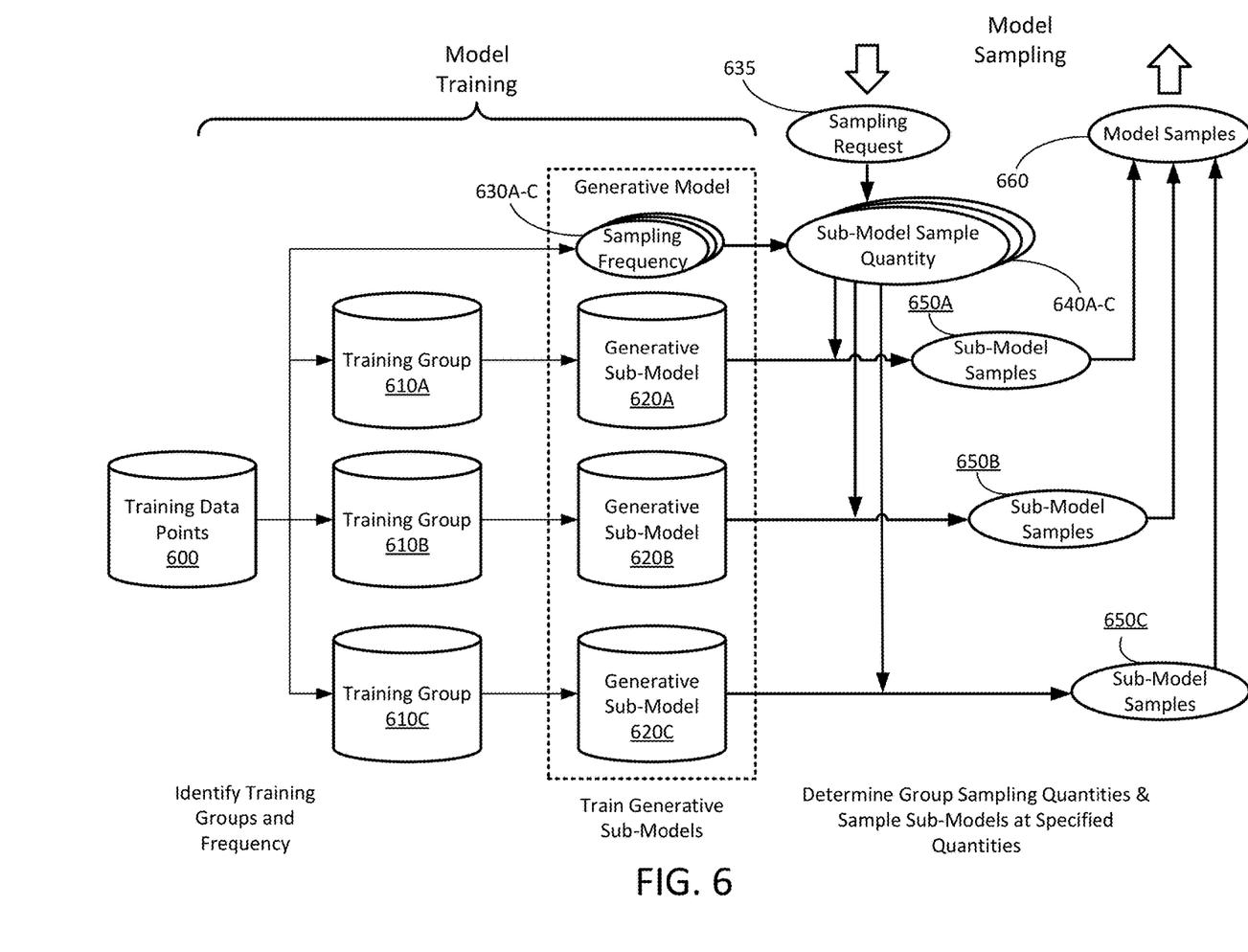
FIG. 6 shows an example process for training and using a generative model that includes a plurality of generative sub-models, according to one embodiment.

FIG. 6 shows an example process for training and using a generative model that includes a plurality of generative sub-models, according to one embodiment. The generative model may be trained, for example, by a training module 120. Rather than modeling the data set as a whole as one manifold, different portions of the data set are modeled as individual manifolds represented by each of the generative sub-models 620A-C. By identifying the different manifolds and modeling them separately, each manifold may be more effectively trained, avoiding erroneous regions connecting manifolds (as shown in FIG. 3) without affecting overall accuracy or increasing training time/costs. In this example, three generative sub-models 620A-C are shown, corresponding to three groups of training data 610A-C; in additional embodiments, the number training groups and corresponding sub-models varies. As discussed below, the number of groups and group membership may be automatically determined, such as with a clustering algorithm.

Initially, a set of training data points 600 represents the training data samples for which the generative model is to be trained. The training data samples are then grouped to a number of training groups 610A-C to group similar data samples (e.g., data samples expected to belong to the same manifold should be in the same group). In some embodiments, the data is grouped according to data labels, such as specified class labels. In other embodiments, the data points are grouped according to a clustering algorithm that groups training samples based on a measure of similarity or inferred similarity between items. For example, groups may be generated with an agglomerative clustering or k-means clustering algorithm, although other clustering approaches may also be used. The clustering algorithms may operate by grouping items according to distance measures between data samples and/or clusters. These clustering approaches may be used, for example, to identify group relationships when express labels are not available. In one embodiment of agglomerative clustering, the linkage value (as a type of distance measure) for combining clusters is Ward's linkage criterion, in which the distance between two clusters is the variance of the Euclidian distance between all datapoints in the clusters being merged, such that the clusters having the smallest variance is combined. Other linkage criteria may also be used in varying embodiments.

In some embodiments, the number of clusters (i.e., groups) may be specified as a hyperparameter. In some embodiments, the number of clusters is estimated from the data, for example based on distances between groups in the data space or by other methods. Example approaches include centroid-based approaches, hierarchical clustering, and density-based clustering. The grouping results in a set of training groups of data samples (in FIG. 6 as three training groups 610A-C) that partition the training data points (e.g., each data point belongs to only one training group 610).

In addition, the ratio or frequency of data samples for each training group is identified with respect to the data set to be stored in association with the generative model. This frequency is designated as a sampling frequencies 630A-C that represent, for the respective training group, a respective rate that the group appears in the overall training data and thus the frequency that associated sub-model should be sampled to reproduce the distribution of each group in the overall training data set. The sampling frequencies may also be represented as a probability distribution (e.g., a multinomial distribution) for sampling data points of the generative sub-models 620A-C.

The generative sub-models 620A-C are then trained based on the respective training groups. Any suitable generative model architecture and training process for modeling manifolds may be used, such as the pushforward models discussed above. In some embodiments, the generative sub-models 620A-C may have the same model architecture. In some embodiments, the generative sub-models may have differed model architectures that are modified based on the data samples in the training group 610A-C. For example, an intrinsic dimensionality of the data points in a data group 610 may be estimated (e.g., using the dimensionality estimation discussed above, and used to modify parameters of the associated generative sub-model 620). As one example, the number of dimensions for a latent space modeled by each generative sub-model (e.g., the number of dimensions in Z shown in FIG. 3) is specified based on the estimated intrinsic dimensionality, such that each generative sub-model is trained to learn a respective manifold $M_\ell$ with associated dimensions $d^{(\ell)}$. In other examples, other parameters of a generative sub-model architecture may also be modified to account for the different complexity of the data in different training groups. For example, the model architecture itself may be modified to be more or less complex based on the complexity represented by the different intrinsic dimensionality. A number of model layers, layer types, model components, and so forth, may be modified based on the intrinsic dimensionality. In one embodiment, the model architecture complexity is relatively increased when a group has relatively higher intrinsic dimensionality. These may be automatically modified by the training module 120 for each generative sub-model.

As the training data is separated to different training groups 610A-C, training the set of generative sub-models 620A-C may have substantially the same training cost in computation requirements as training a single generative model that represents the data set as a whole (e.g., when the model architectures are the same). Though the sub-models may require additional data storage requirements (e.g., storing the learned parameters for each sub-model), the training cost may be similar because, where a single model may be trained on the entire training data set (e.g., incurring the computational costs of computing loss functions, updating gradients, etc. for training batches across the entire set of training data points), each generative sub-model may incur a portion of those costs according to the portion of the training data in the associated training group 610A-C. As such, the training process may have a similar processing cost for the generative sub-models while gaining the benefit of capturing separate manifolds more accurately. After training, the generative sub-models 620A-C are stored (e.g., with respective trained parameters and architecture), along with the respective sampling frequencies 630A-C as the overall generative model for the set of training data points 600.

To sample new data points from the generative model, the sampling module may receive a sampling request 635 (e.g., from another device) specifying a number of samples to obtain from the generative model. Because the different training groups are not typically evenly represented in the training data points 600, the sampling frequencies 630A-C may be used to determine respective sub-model sample quantities 640A-C indicating the number of times to sample from each sub-model. In some embodiments, the sampling frequencies 630A-C is represented as a probability distribution (e.g., as a multinomial distribution) among the generative sub-models, such that sampling of the probability distribution indicates which sub-model to use for generating a particular data sample. Thus, although there may be a specific ratio of data samples corresponding to each training group, a particular number of samples from the generative model may return different ratios from the respective generative sub-models according to the resulting sub-model sample quantity 640A-C obtained from sampling from the probability distribution. For example, the three groups may have a ratio of 6:3:1 in the data set, and a sampling from the probability distribution may yield a quantity of 55, 32, and 13 samples from the respective sub-models.

Each generative sub-model 620A-C is sampled from the designated number of sub-model sample quantity 640A-C to generate respective sub-model samples 650A-C. Together, the sub-model samples 650A-C are collected as the overall generative model samples 660 and may be provided as a response to the sampling request 635. When the sampling request 635 requests a significant quantity of samples, this approach optimizes sub-model execution efficiency by first determining the number of times to apply each model (i.e., the number of samples to generate) and then sequentially sample each model for the specified quantity. For example, a first sub-model may be loaded to a memory, sub-model samples repeatedly generated until the associated sub-model sample quantity, and then a second sub-model may be loaded to generate its samples. As such, each sub-model can be loaded to memory a single time while its sample quantity is generated. In addition, other than loading each sub-model, the execution time for generating samples may be substantially the same for a generative model representing a single manifold compared to a generative model composed of sub-models representing several manifolds (when the single model and the sub-models have substantially similar architectures). As such, the additional complexity that can be captured by the generative sub-models may not affect execution time to sample from the model, computation follows similar (or the same) architectures in generating the samples.

Figure 7:
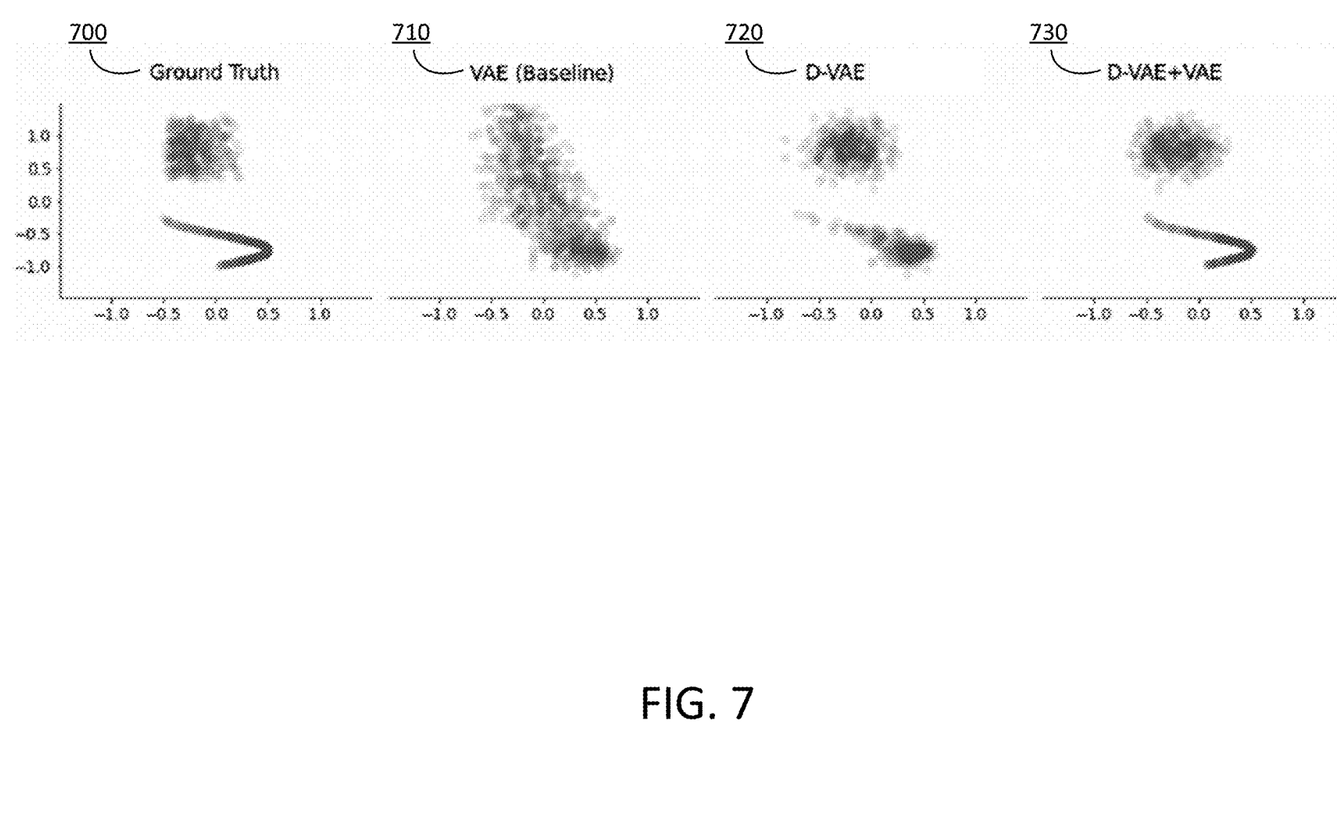
FIG. 7 shows example generative model outputs for synthetic ground truth data, according to different model types, including example embodiments.

FIG. 7 shows example generative model outputs for synthetic ground truth data, according to different model types, including example embodiments. In this example, the ground truth is synthetic data generated as two disconnected regions in the illustrated sample space and shown in a first panel 700. The synthetic data is generated such that the upper portion is generated with an intrinsic dimensionality of 2, while the lower portion is generated with an intrinsic dimensionality of 1. A standard variable autoencoder (VAE) was trained on this data set as a generative model and is shown in a second panel 710, illustrating the learned manifold and density learned by the VAE generative model as a single manifold in two dimensions. As shown in this example, the learned manifold significantly differs from the ground truth distribution shown in the first panel 700—the VAE fails to successfully recover this disconnected data, illustrating this limitation of pushforward models.

The third panel 720 illustrates a learned manifold by a disconnected VAE (D-VAE), in which two sub-models were trained based on the two groups of data in the ground truth (e.g., according to FIG. 6 with two data groups). The third panel 720 shows a disconnected VAE (denoted D-VAE) that was given the same computational budget training budget as the VAE shown in the second panel 710. The disconnected VAE, with its separate sub-models, correctly recovers two regions (but not their intrinsic dimensions) and significantly improves the resulting representation of the ground truth of the first panel 700. This demonstrates the potential for improvement for these models simply by aligning modeling with sub-models to capture separate manifolds.

A fourth panel 730 illustrates the benefits of this approach by training a disconnected two-step VAE (indicated as "D-VAE+VAE"). This model is trained by clustering the data to obtain its connected components, estimating the respective intrinsic dimensions as 2 and 1, and then training a VAE+VAE model on each of these clusters. In the VAE+VAE approach, one VAE learns a mapping from the data space to a respective latent space, and the other learns a probability distribution in the latent space. In the first cluster (of intrinsic dimension 2), the first VAE obtains 2-dimensional representations, and the second VAE learns the distribution of these representations. The same is done for the second cluster, except the first VAE obtains 1-dimensional representations with the correct intrinsic dimensionality. Comparing the effectiveness with respect to the second cluster for the third panel 720 and fourth panel 730 shows that although the third panel 720 represents the second cluster with an additional dimension relative to the fourth panel 730, the additional dimension yields worse results in capturing the respective portion of the ground truth of the first panel 700. The fourth panel 730 thus shows the further improvement available by also modeling the different intrinsic dimensions for each manifold, presenting further improvement towards the ground truth shown in the first panel 700.

Classification with Intrinsic Dimensionality

To apply differing underlying dimensionality to multi-class classification, classification training weighs data points according to the intrinsic dimensionality of the respective data sample. To do so, initially the data samples may be grouped and the intrinsic dimensionality estimated as discussed above with respect to FIG. 6. For classification tasks, the training data is typically labeled with class labels to be learned, such that the data sample groups are the data items of each class. The intrinsic dimensionality of each class is estimated as discussed above and used to affect the training of the classifier. In one embodiment, a loss function for the data samples may have its contribution for different classes weighed (e.g., increased or decreased) based on the intrinsic dimensionality, such that the loss contribution is relatively increased for classes of relatively higher intrinsic dimensionality and relatively decreased for relatively lower intrinsic dimensionality. In one embodiment, the loss function is a cross-entropy loss function in which the cross-entropy loss for classes is weighed by the intrinsic dimensionality of each class.

As one example embodiment, a categorical cross-entropy loss for data samples $\{x_i \ldots x_n\}$ across classes L is defined as:

$$-\sum_{i=1}^{n}\sum_{\ell=1}^{L} w_\ell \cdot y_{i,\ell} \cdot \log f_\theta(x_i)_\ell \quad \text{Equation 2}$$

in which $y_i$ is a one-hot vector of length L corresponding to the label of $x_i$, $f_\theta(x_i)$ is the L-dimensional output of the classifier (with parameters $\theta$) containing assigned class probabilities, and $w_\ell$ is the scalar weight given to the $\ell^{th}$ class.

In one embodiment, the scalar weight $w_\ell$ is determined based on a proportional complexity of a class relative to other classes. In one embodiment, the scalar weight is determined according to:

$$w_\ell = L \cdot \frac{\widehat{d}_k^{(\ell)}}{\sum_{\ell'=1}^{L} \widehat{d}_k^{(\ell')}} \quad \text{Equation 3}$$

in which L is the total number of classes, $\widehat{d}_k^{(\ell)}$ is the intrinsic dimensionality of the $\ell^{th}$ class, $\sum_{\ell'=1}^{L} \widehat{d}_k^{(\ell')}$ is a sum of intrinsic dimensionality of the classes other than the $\ell^{th}$ class.

In this example, the intrinsic dimensionality of a class is estimated according to a hyperparameter k of the dimensionality estimator referenced above. In various embodiments, k may be set to various values, and dimensionality may also be estimated with other approaches and equivalently used to weigh a class.

Table 1 shows a comparison of 1) a classifier trained with a cross-entropy including weights based on class intrinsic dimensionality according to Equations 2 and 3 compared with 2) a standard cross-entropy loss (without intrinsic dimensionality weighing) for an experiment performed on the CIFAR-100 data set with a ResNet-18 model architecture:

TABLE 1

Means and standard errors of ResNet-18 accuracy on CIFAR-100 across 5 runs.

| Weights | Test accuracy |
| --- | --- |
| Standard | 61.38% ± 0.17% |
| Proportional to intrinsic dimension | 61.77% ± 0.20% |

This modified weighing focuses more on classes of higher intrinsic dimension, as these may be more difficult to classify (as shown in FIG. 5). In this experiment, this change to the cross-entropy loss increased the test accuracy above the margin of error, providing a modest, though significant improvement that is also computationally inexpensive given the low computational overhead of estimating intrinsic dimension. As such, consideration of data dimensionality can also be used to improve classification models as well as generative models.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for a training a generative model of data on disjoint manifolds, comprising:
   one or more processors;
   one or more non-transitory computer-readable media containing instructions for execution by the one or more processors for:
      identifying a plurality of training samples for which to train a generative model;
      grouping the plurality of training samples to a plurality of groups;
      generating a plurality of generative sub-models corresponding to a number of the plurality of groups by, for each group of the plurality of groups:
         identifying a sampling frequency for sampling the sub-model based on a number of training samples associated with the group relative to the plurality of training samples; and
         training a generative sub-model for the group based on the training samples of the group; and
      storing the generative model as the plurality of generative sub-models and the associated sampling frequency for each sub-model.

2. The system of claim 1, wherein each sub-model models a different continuous manifold of a high-dimensional space of the training samples.

3. The system of claim 1, wherein at least one of the generative sub-models is a pushforward model from a latent space having lower dimensionality than a dimensionality of a high-dimensional space of the training data samples.

4. The system of claim 1, wherein training the generative sub-model for at least one group comprises:
   determining a latent dimensionality of the group based on the data samples of the group;
   setting one or more parameters for the generative sub-model based on the latent dimensionality of the group; and
   training the generative sub-model for the group based on the one or more parameters.

5. The system of claim 1, wherein the plurality of generative sub-models include modeling with respect to latent spaces that do not have the same latent dimensionality.

6. The system of claim 1, the instructions further being for:
   receiving a sampling request to generate a total number of samples from the generative model;
   determining, based on the associated sampling frequency of each sub-model, a sub-model sample quantity for each sub-model;
   generating a set of model samples by generating samples from each sub-model according to the sample quantity; and
   providing the set of model samples as a response to the sampling request.

7. The system of claim 6, wherein the associated sampling frequency for each sub-model is represented as a probability distribution; and determining the sub-model sample quantity for the sub-model comprises sampling from the probability distribution a number of times according to the total number of samples for the generative model.

8. The system of claim 6, wherein generating samples from each sub-model according to the sample quantity comprises:
   loading a first sub-model to a memory;
   sampling the first sub-model at the associated sub-model sample quantity;
   after generating all samples for the first sub-model, loading a second sub-model to the memory; and
   sampling the second sub-model at the associated sub-model sample quantity.

9. The system of claim 1, wherein grouping the plurality of training samples comprises an agglomerative clustering algorithm.

10. The system of claim 1, wherein the plurality of training samples are images.

11. A method for a training a generative model of data on disjoint manifolds, comprising:
   identifying a plurality of training samples for which to train a generative model;
   grouping the plurality of training samples to a plurality of groups;
   generating a plurality of generative sub-models corresponding to a number of the plurality of groups by, for each group of the plurality of groups:
      identifying a sampling frequency for sampling the sub-model based on a number of training samples associated with the group relative to the plurality of training samples; and
      training a generative sub-model for the group based on the training samples of the group; and
   storing the generative model as the plurality of generative sub-models and the associated sampling frequency for each sub-model.

12. The method of claim 11, wherein each sub-model models a different continuous manifold of a high-dimensional space of the training samples.

13. The method of claim 11, wherein at least one of the generative sub-models is a pushforward model from a latent space having lower dimensionality than a dimensionality of a high-dimensional space of the training data samples.

14. The method of claim 11, wherein training the generative sub-model for at least one group comprises:
   determining a latent dimensionality of the group based on the data samples of the group;
   setting one or more parameters for the generative sub-model based on the latent dimensionality of the group; and
   training the generative sub-model for the group based on the one or more parameters.

15. The method of claim 11, wherein the plurality of generative sub-models include modeling with respect to latent spaces that do not have the same latent dimensionality.

16. The method of claim 11, the method further comprising:
   receiving a sampling request to generate a total number of samples from the generative model;
   determining, based on the associated sampling frequency of each sub-model, a sub-model sample quantity for each sub-model;
   generating a set of model samples by generating samples from each sub-model according to the sample quantity; and
   providing the set of model samples as a response to the sampling request.

17. The method of claim 16, wherein the associated sampling frequency for each sub-model is represented as a probability distribution; and determining the sub-model sample quantity for the sub-model comprises sampling from the probability distribution a number of times according to the total number of samples for the generative model.

18. The method of claim 16, wherein generating samples from each sub-model according to the sample quantity comprises:
    loading a first sub-model to a memory;
    sampling the first sub-model at the associated sub-model sample quantity;
    after generating all samples for the first sub-model, loading a second sub-model to the memory; and
    sampling the second sub-model at the associated sub-model sample quantity.

19. The method of claim 11, wherein grouping the plurality of training samples comprises an agglomerative clustering algorithm.

20. The method of claim 11, wherein the plurality of training samples are images.

* * * * *